(12) United States Patent
Steiner et al.

(10) Patent No.: US 8,042,769 B2
(45) Date of Patent: Oct. 25, 2011

(54) MODULAR AIRCRAFT WINDOW

(75) Inventors: Gottfried Steiner, Spielberg (AT);
Mario Staubmann, Spielberg (AT)

(73) Assignee: FACC AG, Ried im Innkreis (AT)

( * ) Notice: Subject to any disclaimer, the term of this patent is extended or adjusted under 35 U.S.C. 154(b) by 646 days.

(21) Appl. No.: 11/801,960

(22) Filed: May 11, 2007

(65) Prior Publication Data

US 2008/0099615 A1    May 1, 2008

(30) Foreign Application Priority Data

Oct. 25, 2006   (AT) ................. A 1804/2006

(51) Int. Cl.
*B64C 1/14* (2006.01)

(52) U.S. Cl. ................................... 244/129.3

(58) Field of Classification Search ............. 244/129.3; 160/84.02, 84.04, 90, 98, 107, 343, 370.23; 74/424.71, 424.75, 89.23
See application file for complete search history.

(56) References Cited

U.S. PATENT DOCUMENTS

| | | | | |
|---|---|---|---|---|
| 3,652,037 A * | 3/1972 | Dolby | | 74/424.71 |
| 4,998,576 A * | 3/1991 | Moreno | | 160/90 |
| 6,059,006 A * | 5/2000 | Rossini | | 160/107 |
| 6,065,524 A * | 5/2000 | Rossini | | 160/107 |
| 6,745,810 B1 * | 6/2004 | Moreno et al. | | 160/90 |
| 2006/0283559 A1 * | 12/2006 | McCormick et al. | | 160/168.1 P |

* cited by examiner

*Primary Examiner* — Tien Dinh
*Assistant Examiner* — Richard R Green
(74) *Attorney, Agent, or Firm* — Laurence A. Greenberg; Werner H. Stemer; Ralph E. Locher

(57) ABSTRACT

A modular aircraft window includes an outer pane and an inner pane each inserted in a substantially rectangular frame. A foldable shade is disposed on one of the frames and has a freely movable end that is coupled with an operating unit for opening and closing the shade. The assembly further includes at least one shade raising and lowering mechanism in one or both of the longitudinal parts of the frame and a drive mechanism mounted in the lower transverse part of the frame. The drive mechanism includes a threaded spindle which, in order to provide for a particularly stable and long-lasting construction of the drive mechanism, is movable solely translationally and is coupled with a transmission mechanism operating the at least one raising and lowering mechanism.

8 Claims, 14 Drawing Sheets

MODULAR AIRCRAFT WINDOW

CROSS-REFERENCE TO RELATED APPLICATION

This application claims the priority, under 35 U.S.C. §119, of Austrian application A 1804/2006, filed Oct. 25, 2006; the prior application is herewith incorporated by reference in its entirety.

BACKGROUND OF THE INVENTION

Field of the Invention

The invention relates to a modular aircraft window including an outer pane and an inner pane each inserted in a substantially rectangular frame, a foldable shade arranged on one of the frames and having a freely movable end coupled with an operating unit that is provided for opening and closing the shade and includes at least one shade-raising and lowering mechanism disposed in one of the longitudinal parts of the frame, as well as a drive mechanism mounted in the lower transverse part of the frame and including a threaded spindle.

A modular aircraft window of the foregoing kind is known from U.S. Pat. No. 4,998,576. The drive mechanism for opening and closing the shade comprises a spindle provided with an external thread and mounted on the lower transverse part of the outer pane frame. The spindle is set in rotation upon operation of the mechanism, thus causing the movement of a drive sprocket driving a toothed belt connected with the shade. The rotation of the threaded spindle is, in particular, effected by a coupling part provided with an internal thread and seated on the threaded spindle.

SUMMARY OF THE INVENTION

It is accordingly an object of the invention to provide a modular aircraft window as described above, which overcomes the above-mentioned disadvantages of the heretofore-known devices and methods of this general type and which is provided with a stable and long-lasting, yet simply structured drive mechanism for the shade and to ensure a convenient operation of the shade while requiring as little force as possible.

With the foregoing and other objects in view there is provided, in accordance with the invention, a modular aircraft window, comprising:

an outer pane and an inner pane;
a substantially rectangular frame receiving therein at least one of said outer pane and said inner pane, said frame having longitudinal parts, an upper transverse part and a lower transverse part;
a foldable shade disposed between said outer pane and said inner pane, said shade having a freely movable end;
an operating unit for opening and closing said shade coupled to said freely movable end of said foldable shade, said operating unit including at least one shade-raising and lowering mechanism disposed in one of said longitudinal parts of said frame, a transmission mechanism operating said at least one shade-raising and lowering mechanism, and a drive mechanism mounted in said lower transverse part of said frame, said drive mechanism including a threaded spindle disposed to be movable merely translationally and coupled with said transmission mechanism.

In other words, the objects of the invention are achieved in that the threaded spindle is movable merely translationally and coupled with a transmission mechanism operating the at least one raising and lowering mechanism.

On account of the translational movement of the threaded spindle and its coupling to a transmission mechanism, the invention stands out for its particularly high stability and long-lasting construction. The transmission mechanism enables the required force for operation to be kept extremely low.

According to a preferred embodiment of the invention, a raising and lowering mechanism is arranged in each of the longitudinal parts of the frame, with the transmission mechanism operating both raising and lowering mechanisms simultaneously. This measure in an advantageous manner ensures a highly uniform force transmission without requiring special mechanisms for holding the lower end of the shade in the horizontal state.

The structure of the drive mechanism will be particularly stable if the transmission mechanism comprises a transmission rod extending parallelly with the threaded spindle and firmly connected with drive wheels of the raising and lowering mechanism.

In a preferred variant embodiment of the invention, a gear, particularly of the single-stage cylindrical gear type, is provided between the threaded spindle and the transmission rod. This measure allows for the adjustment of an operation-supporting force transmission.

The gear can be realized in a particularly simple and space-saving fashion in that a toothed wheel operable by the threaded spindle and a toothed wheel firmly connected with the transmission rod are provided.

In order to ensure the longevity of the gear, it is advantageous if the toothed wheel operable by the threaded spindle is rotationally mounted on a bearing housing stationarily arranged relative to the frame.

In a further variant embodiment of the invention, which is designed to be particularly compact and space-saving, the threaded spindle and the transmission rod are coaxially arranged. In this case, it is advantageous if the threaded spindle is designed as a hollow spindle through which the transmission rod extends.

In this variant embodiment, also the transmission mechanism will be particularly simple and compact if a sleeve is arranged coaxially with the transmission rod, which sleeve is firmly connected with the rod and comprises a threaded portion in engagement with the thread of the threaded spindle.

To enable the manual operation of the threaded spindle, it will do to provide a grip element which is firmly connected with the threaded spindle.

In order to stabilize the threaded spindle during its operation by the grip element, it will be advantageous if the grip element is arranged on a carriage, which is displaceably mounted on the frame.

An alternative and particularly convenient operation of the threaded spindle will be provided, if the threaded spindle is movable by the aid of a controllable drive, for instance an electromotor.

Other features which are considered as characteristic for the invention are set forth in the appended claims.

Although the invention is illustrated and described herein as embodied in modular aircraft window, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

In the following description, the terms "upper", "lower", "vertical" and "horizontal" refer to the installed position of the aircraft window, front side or inner side, moreover, referring to a component side facing the aircraft interior, and rear side or outer side referring to a component side facing away from the aircraft interior.

Figure 1:
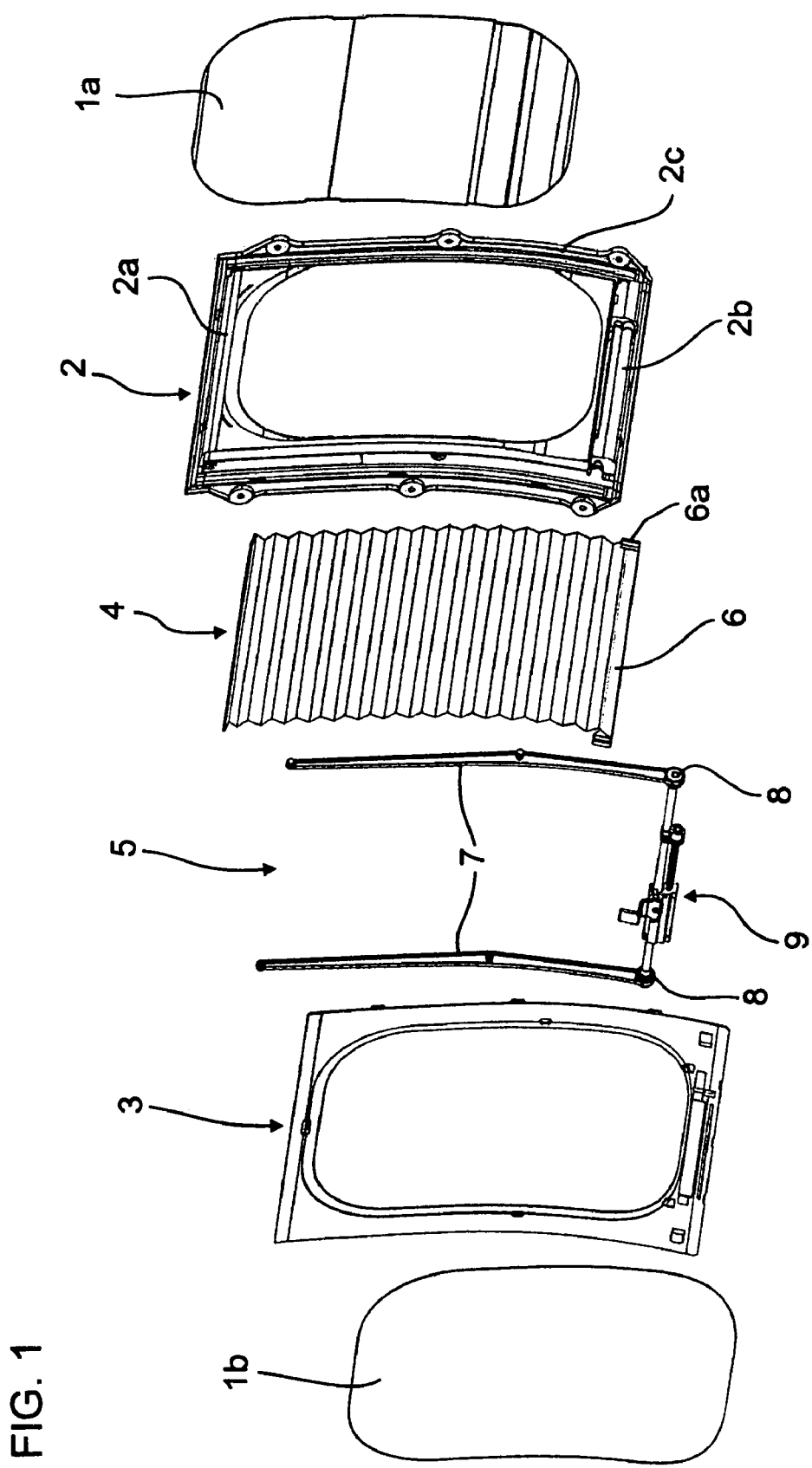
FIG. 1 is an exploded view of the components of an embodiment of a modularly structured aircraft window designed in accordance with the invention.

Referring now to the figures of the drawing in detail and first, particularly, to FIG. 1 thereof, there is illustrated a substantially rectangular, modularly structured aircraft window extending, with its long side, in the vertical direction. The assembly is comprised of an outer pane 1a inserted in a frame 2, an inner pane 1b inserted in a frame 3, a foldable shade 4 that is configured, in particular, in the manner of a foldable roller blind or accordion shade, and an operating unit 5. The frame 2 is comprised of two longitudinal parts 2c, an upper transverse part 2a and a lower transverse part 2b. On the inner side of the frame 2, the longitudinal and transverse parts 2a, 2b, 2c form a housing for accommodating the operating unit 5 and the shade 4.

Figure 2:
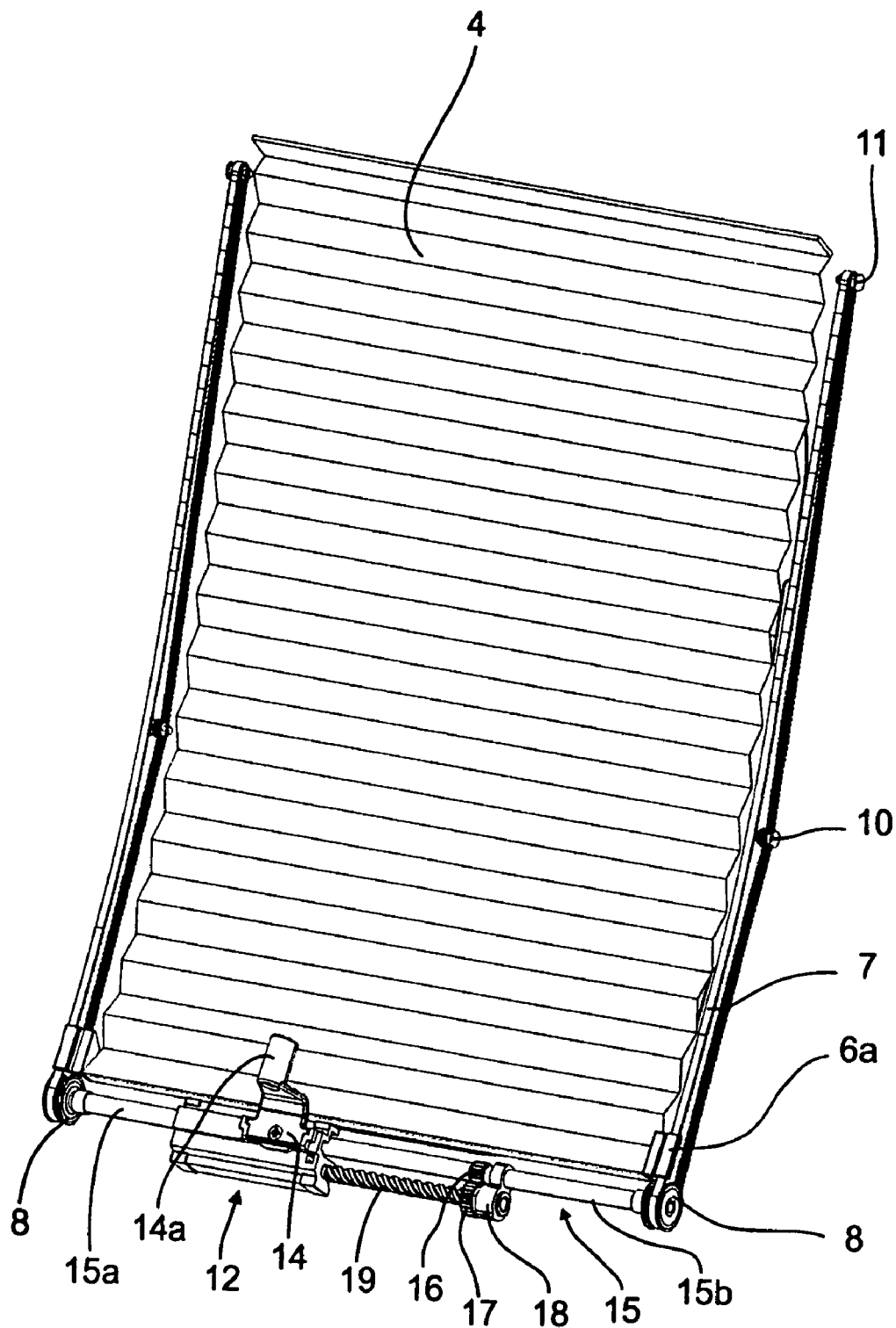
FIG. 2 is a view of an operating unit along with the associated foldable shade.
Figure 3:
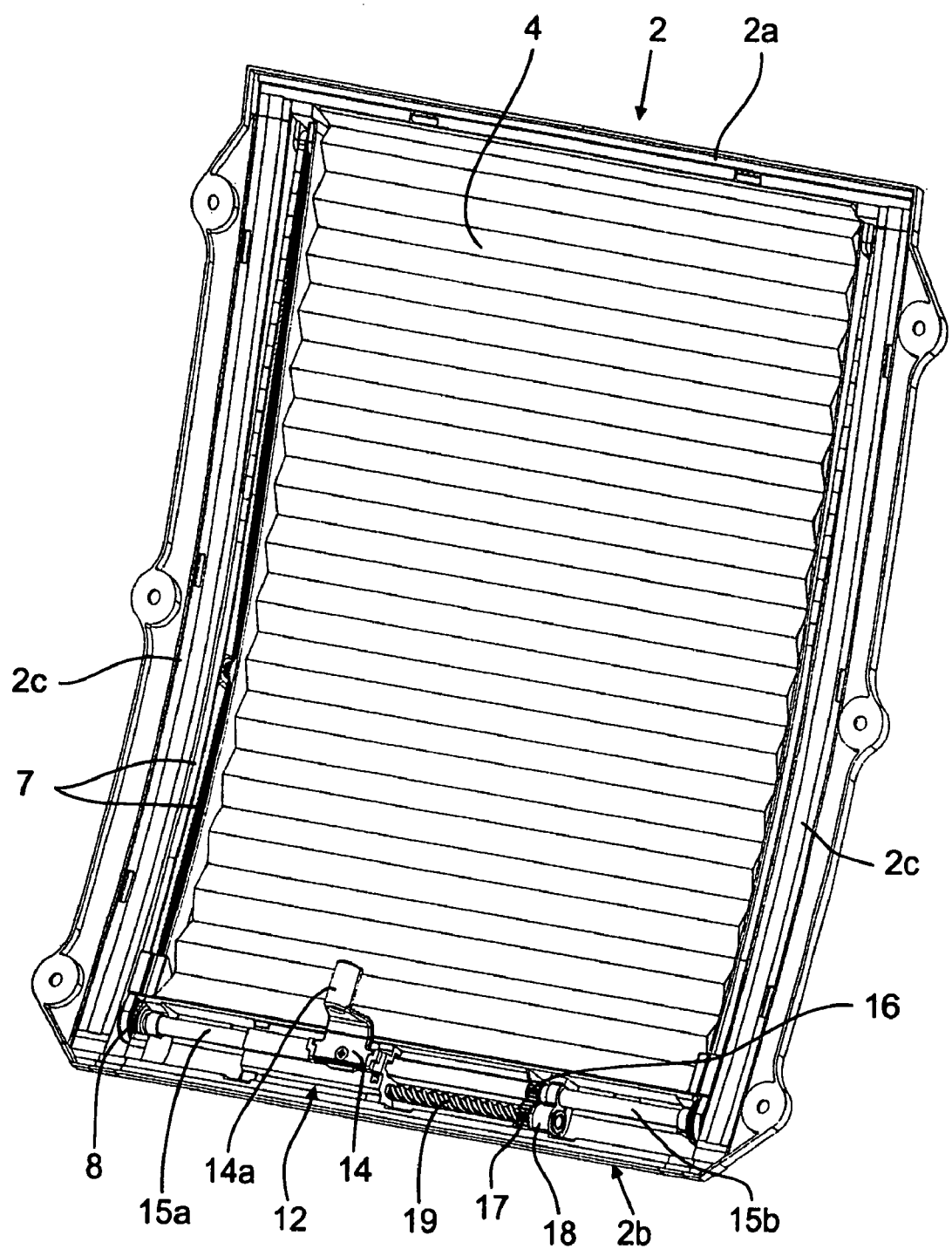
FIG. 3 illustrates the operating unit inserted in a frame along with the shade.

The shade 4, along with the operating unit 5, is positioned on the inner side of the frame 2 and is movable in the vertical direction from a completely folded position on the upper transverse part 2a of the frame 5 into a position completely covering the frame 2, and vice versa. The upper end of the shade 4 is fastened to the upper transverse part 2a of the frame 2. The lower, free and movable end of the shade 4 is provided with an adapter ledge 6 whose lateral ends are each fastened, for instance clamped by clamping parts 6a as illustrated in FIG. 2, to a toothed belt 7 which is continuously guided within the longitudinal parts 2c in the vertical direction laterally of the shade 4. Each of the toothed belts 7 runs around a toothed drive wheel 8 coupled with a drive mechanism 9, which is housed in the lower transverse part 2b of the frame 2.

Moreover, each of the toothed belts 7 runs around a free-running, toothed guide roller 10 mounted on the longitudinal part 2c and a toothed deflection pulley 11 rotationally mounted on the upper end of the longitudinal part 2c of the frame 2. The drive wheels 8, the toothed belt 7 and the rollers 10, 11 constitute the components of the raising and lowering mechanism for the shade 4.

Figure 4:
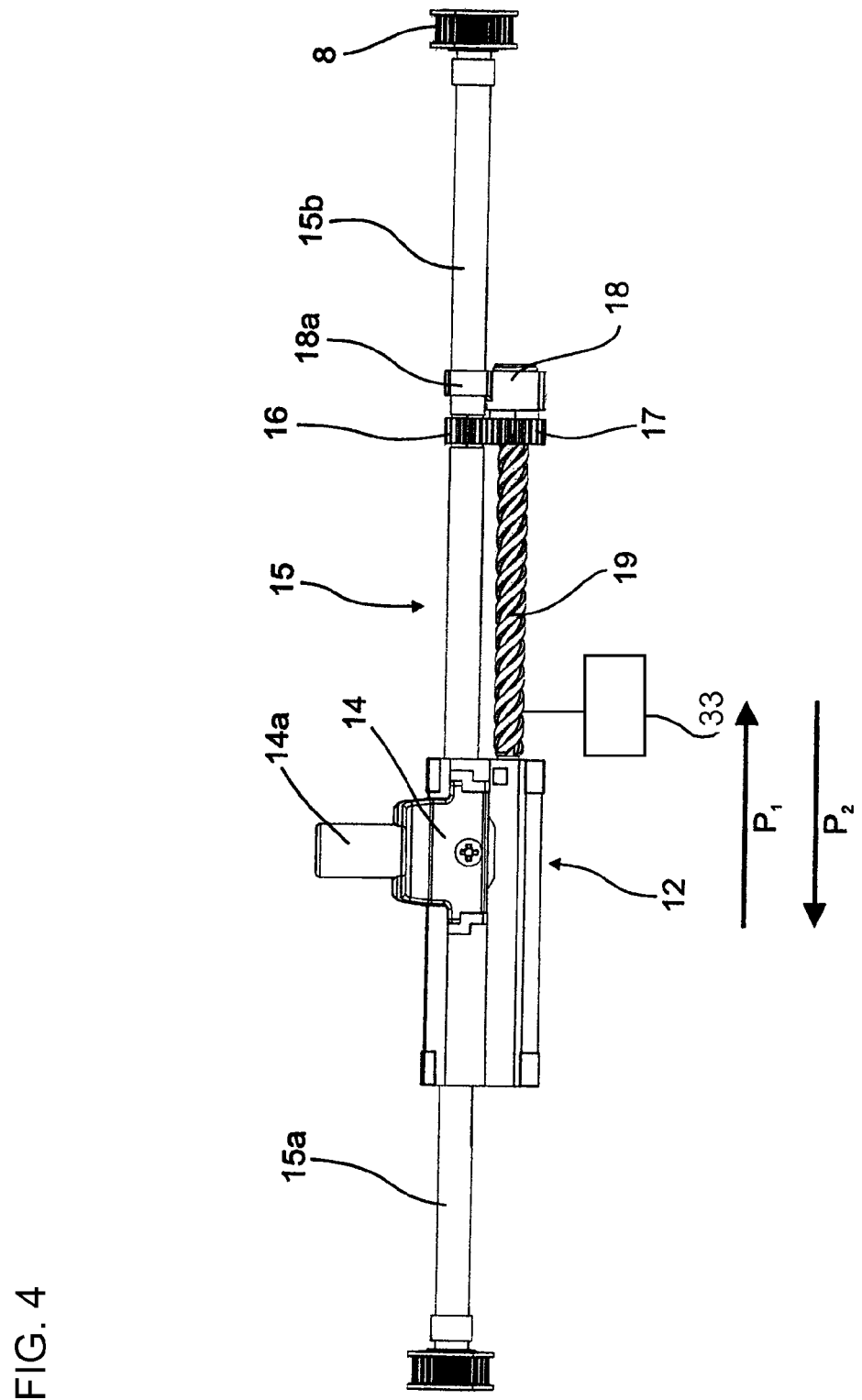
FIG. 4 is the front view of a drive mechanism.
Figure 5:
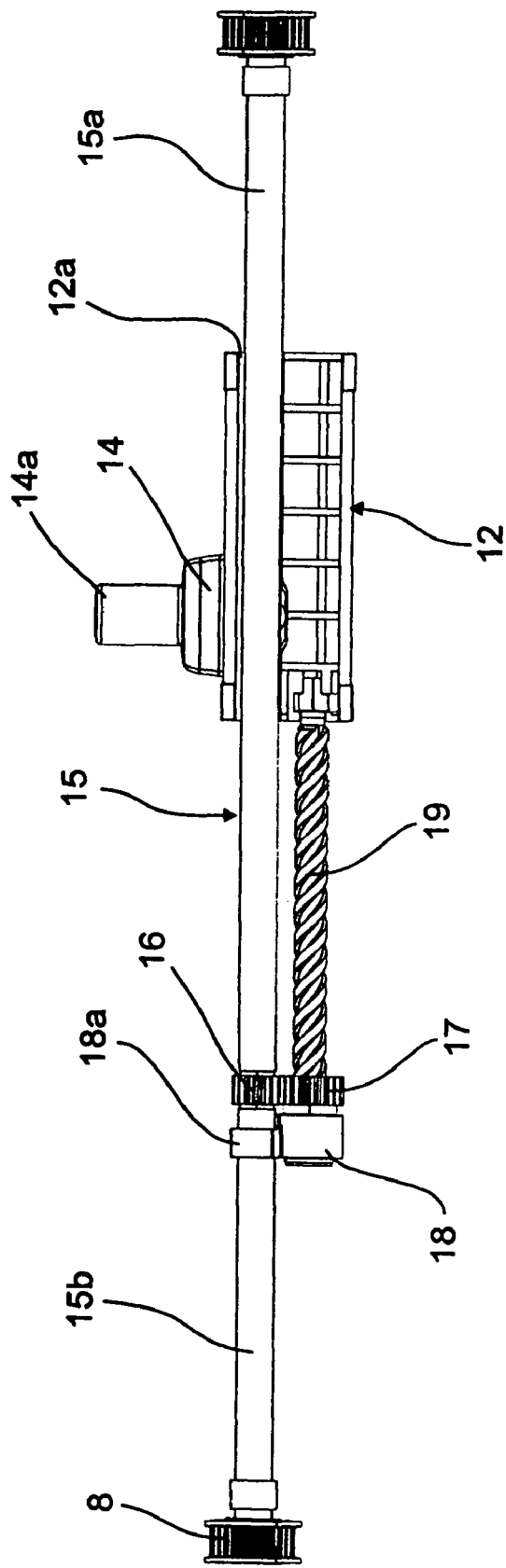
FIG. 5 is a rear view of a drive mechanism.
Figure 6:
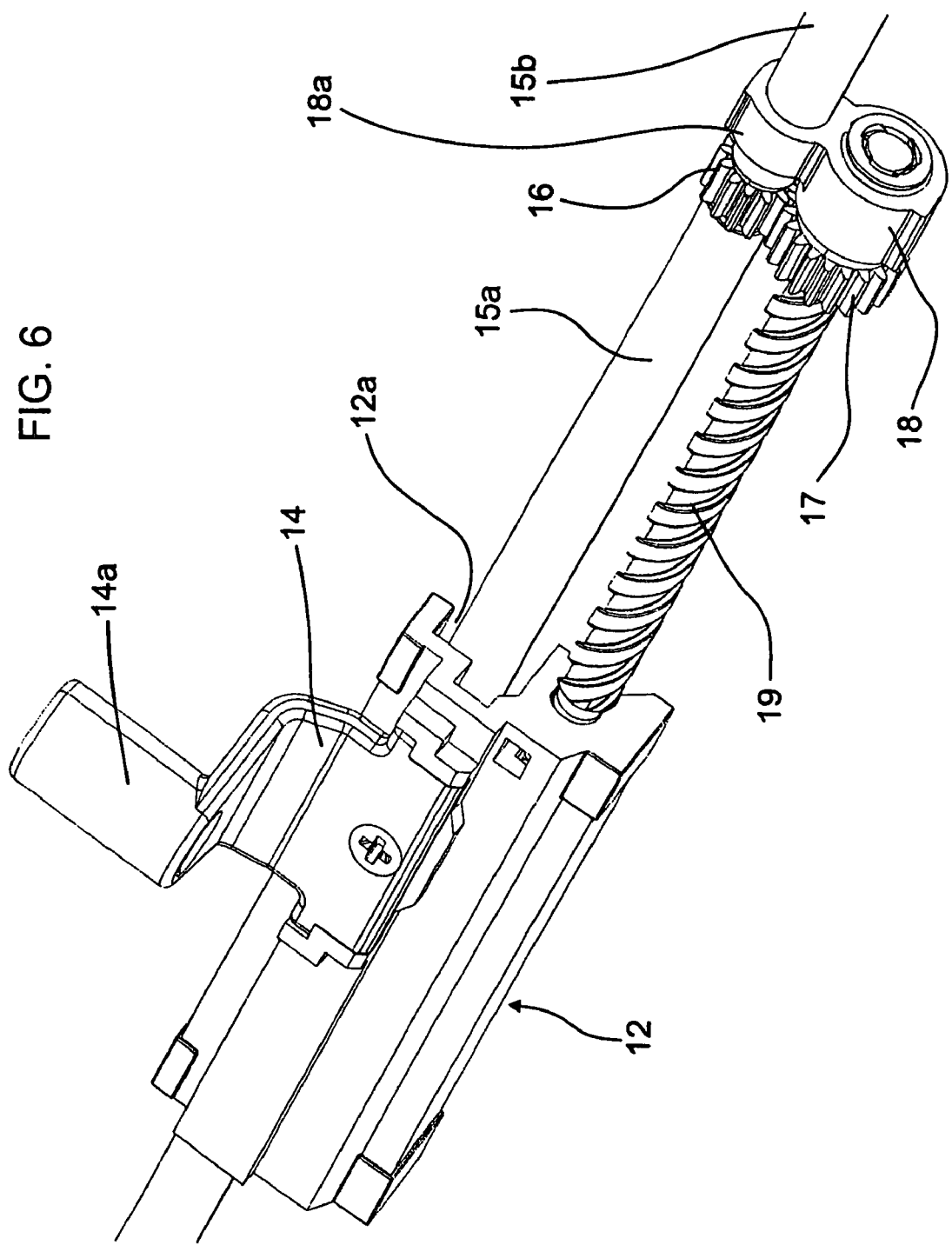
FIG. 6 is a perspective view of a detail from FIG. 4.

FIGS. 4, 5 and 6 depict components of the drive mechanism 9, which comprises a carriage 12 mounted in a recess of the lower transverse part 2b of the frame 2 so as to be displaceable in the horizontal direction. A grip element 14 is disposed on—e.g., screwed to—the carriage 12 and comprises a grip piece 14a which, on the inner side of the window, projects outwardly into the passenger compartment. On its rear side, the carriage 12 in its horizontal direction is provided with a recess or free space 12a (cf. FIG. 6), in which a transmission rod part 15a extends, one end of which is firmly connected with one of the toothed wheels 8, i.e. the left one in the figures of the drawing. The second end of the transmission rod part 15a is fastened to an intermediate piece 20 (cf. FIG. 7) carrying a toothed wheel 16. To the other side of the intermediate piece 20 is fastened a second transmission rod part 15b, which is arranged in alignment with the rod part 15a and firmly connected with the second toothed wheel 8, i.e. the right one in the Figures of the drawing. The transmission rod parts 15a, 15b act like a single rod 15 carrying the toothed wheel 16. The toothed wheel 16 meshes with a second toothed wheel 17, which is larger in diameter and rotationally mounted on a bearing housing 18 held, for instance clamped, in the transverse part 2b of the housing 2. The bearing housing 18 comprises a nose 18a through which the transmission rod part 15a passes, with the rod part 15a being freely rotatable relative to the bearing housing 18.

Figure 7:
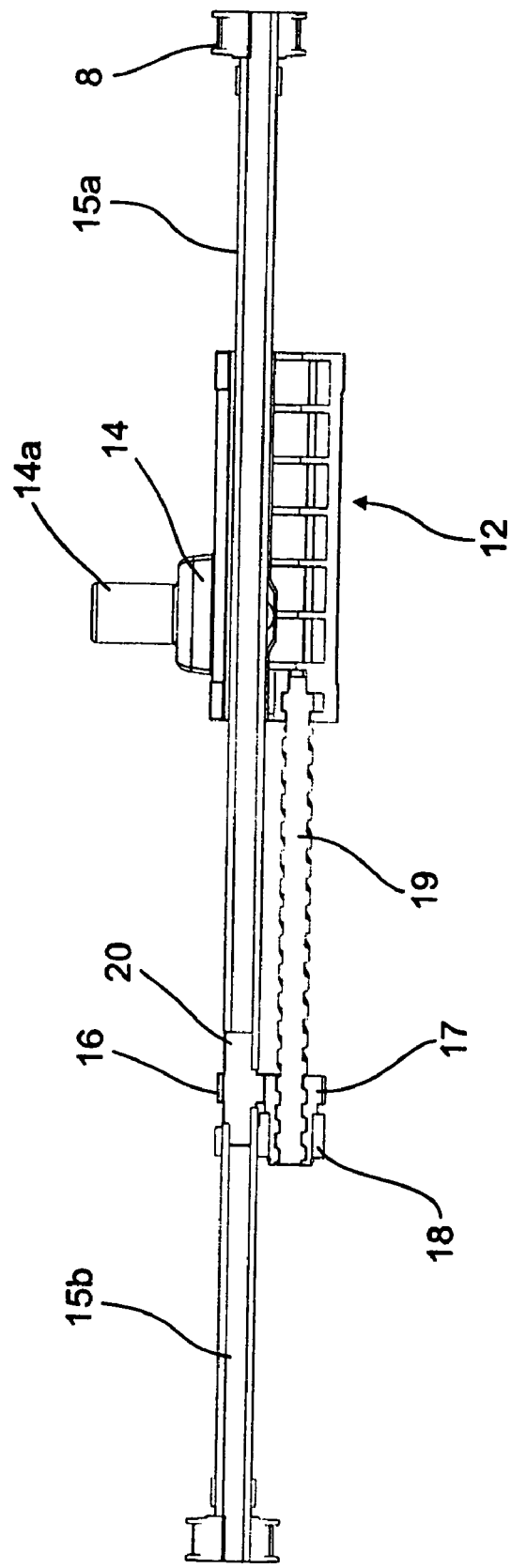
FIG. 7 is a longitudinal section through the drive mechanism according to FIG. 5.

The toothed wheel 17 can be set in a rotational movement by the aid of a threaded spindle 19 extending parallel with the rods 15a, 15b. The threaded spindle 19 is fastened to the carriage 12 and movable along with the latter in the horizontal direction merely translationally. The external thread of the threaded spindle 19 engages in a corresponding internal thread provided in the toothed wheel 17, as is illustrated in FIG. 7. The two toothed wheels 16, 17, thus, form a gear in the manner of a single-stage cylindrical gear.

In FIGS. 2, 4 and 5, the operating unit 5 is shown with the shade 4 lowered. By gripping the grip piece 14a, the carriage 12 can be moved in the sense of the arrow P1 (FIG. 4), with the threaded spindle 19 setting the toothed wheel 17 in a rotational movement, which will be transmitted onto the toothed wheel 16 and, hence, onto the transmission rod 15. The transmission rod 15, or its parts 15a, 15b, set the two toothed wheels 8 in rotational movements such that the toothed belts 7 will be moved. The shade 4 will move upwardly while folding. If and when the carriage 12 and, hence, the threaded spindle 19 are subsequently moved in the opposite direction (arrow P2 in FIG. 4), the shade 4 will be closed. The directions of operation (arrows P1, P2) can, of course, also be inverted by designing and arranging the individual components accordingly.

The individual, cooperating components are tuned to one another in a manner that the available displacement path of the carriage 12 and spindle 19, respectively, ensures that the shade 4 will be brought into its completely open, folded position and vice versa. It is, of course, also possible to place the shade 4 in any intermediate position.

Figure 8:
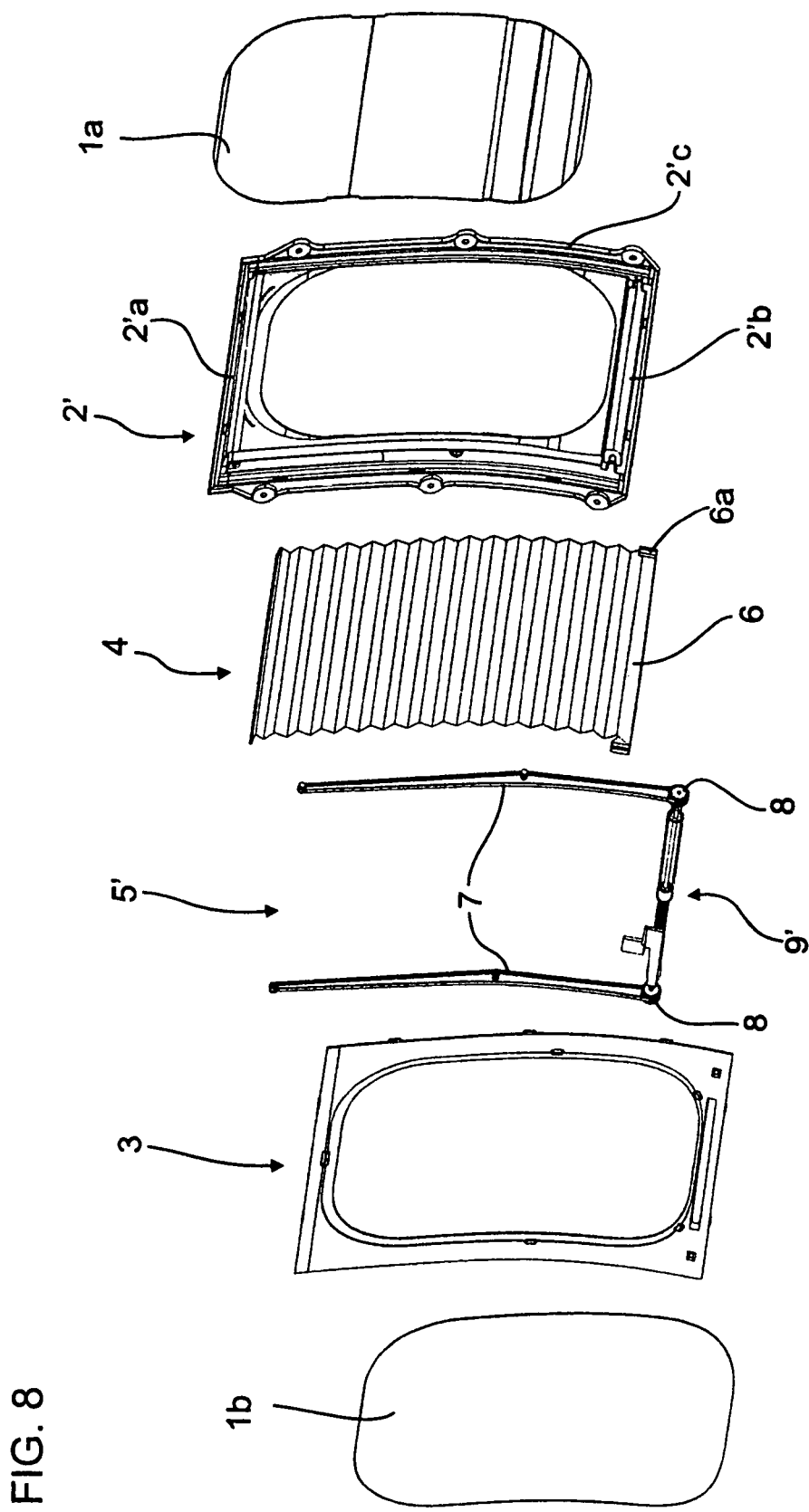
FIG. 8 is an exploded view of the components of a further embodiment of a modularly structured aircraft window designed in accordance with the invention.
Figure 9:
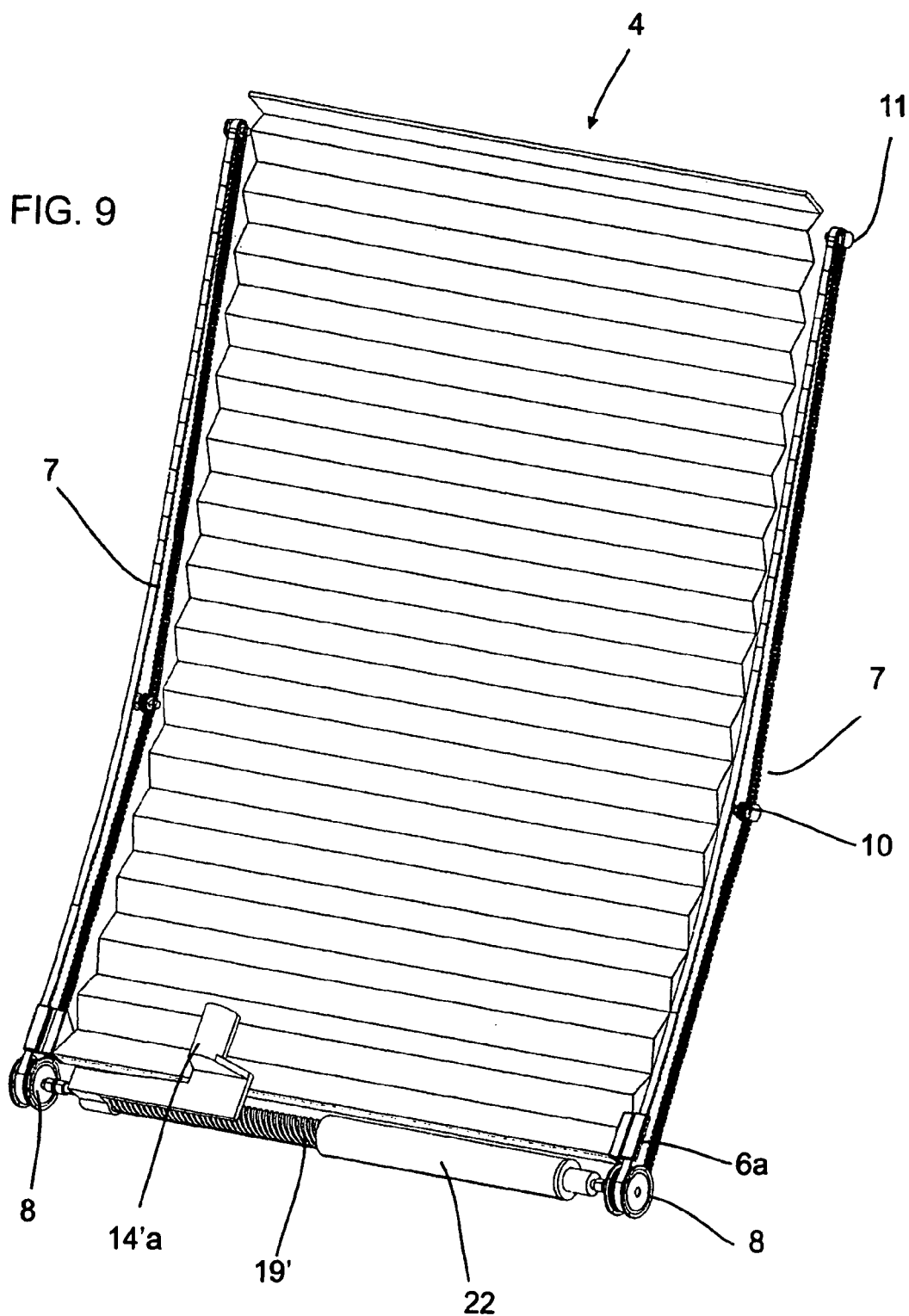
FIG. 9 is a perspective view of an operating unit along with the associated foldable shade.

FIGS. 8 to 14 illustrate a further embodiment of the invention. FIG. 8 depicts the individual components of the aircraft window in a manner analogous to FIG. 1. The configurations of the outer pane 1a, the inner pane 1b, the frame 3, the shade 4, the toothed belts 7, their mounting on drive wheels 8, the guide rollers 10 and the deflection pulleys 11 correspond to those of the first embodiment. The drive mechanism 9' for the foldable shade 4 connected with the toothed belt 7, which is associated to the operating unit 5', as well as the frame 2' are formed in a manner deviating from the first variant embodiment.

Figure 10:
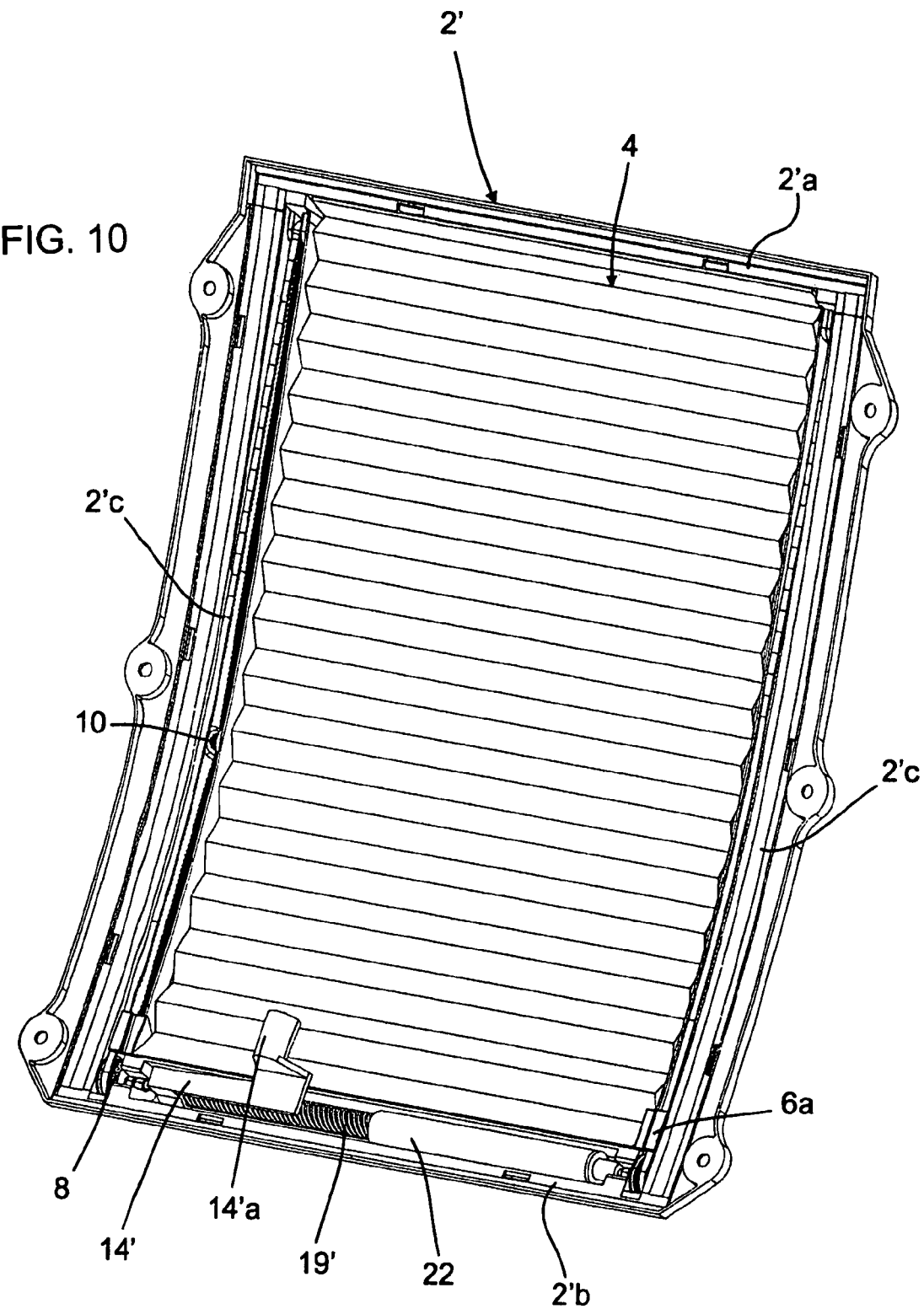
FIG. 10 is a similar perspective view of the operating unit inserted in a frame along with the shade.
Figure 11:
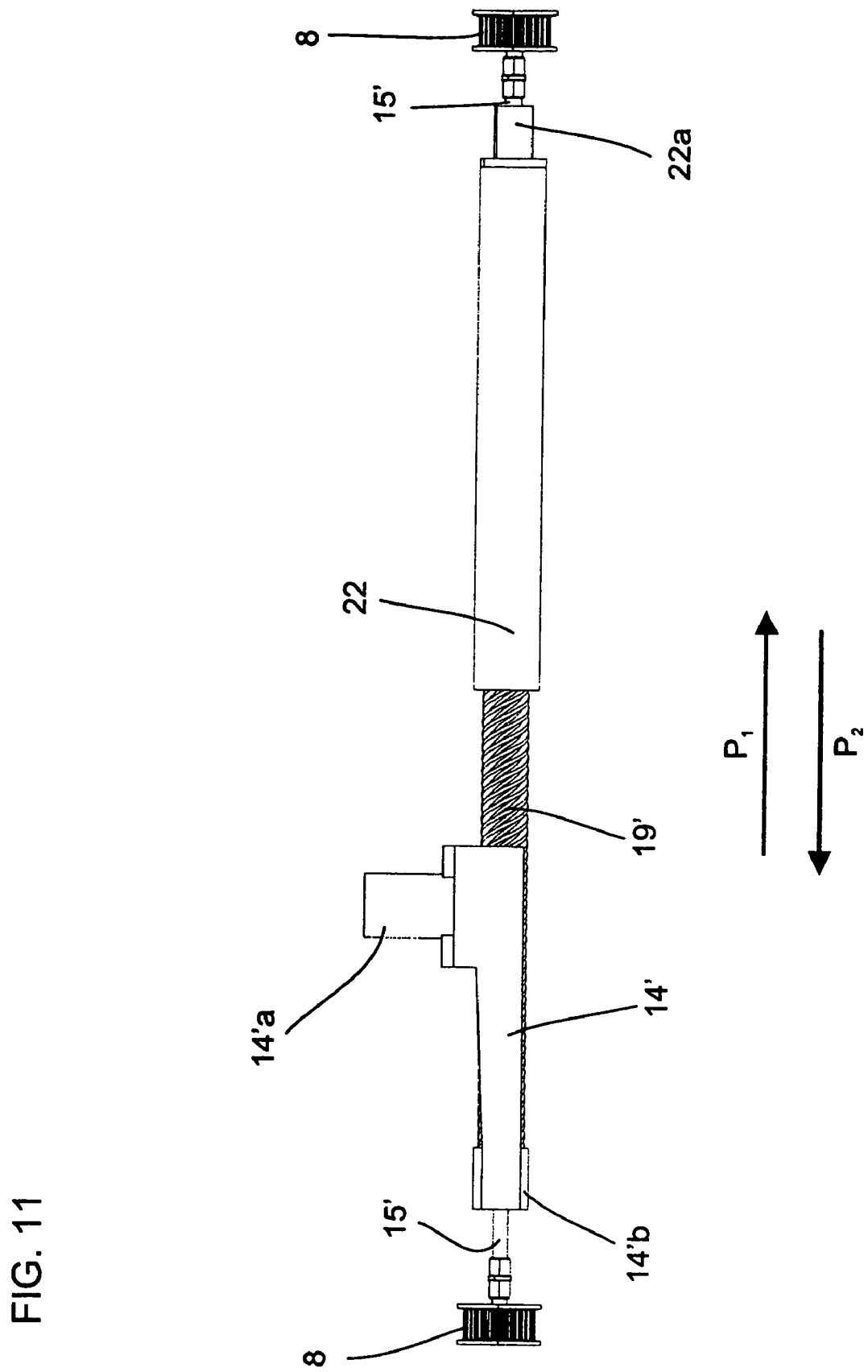
FIG. 11 is the front view of a drive mechanism.
Figure 12:
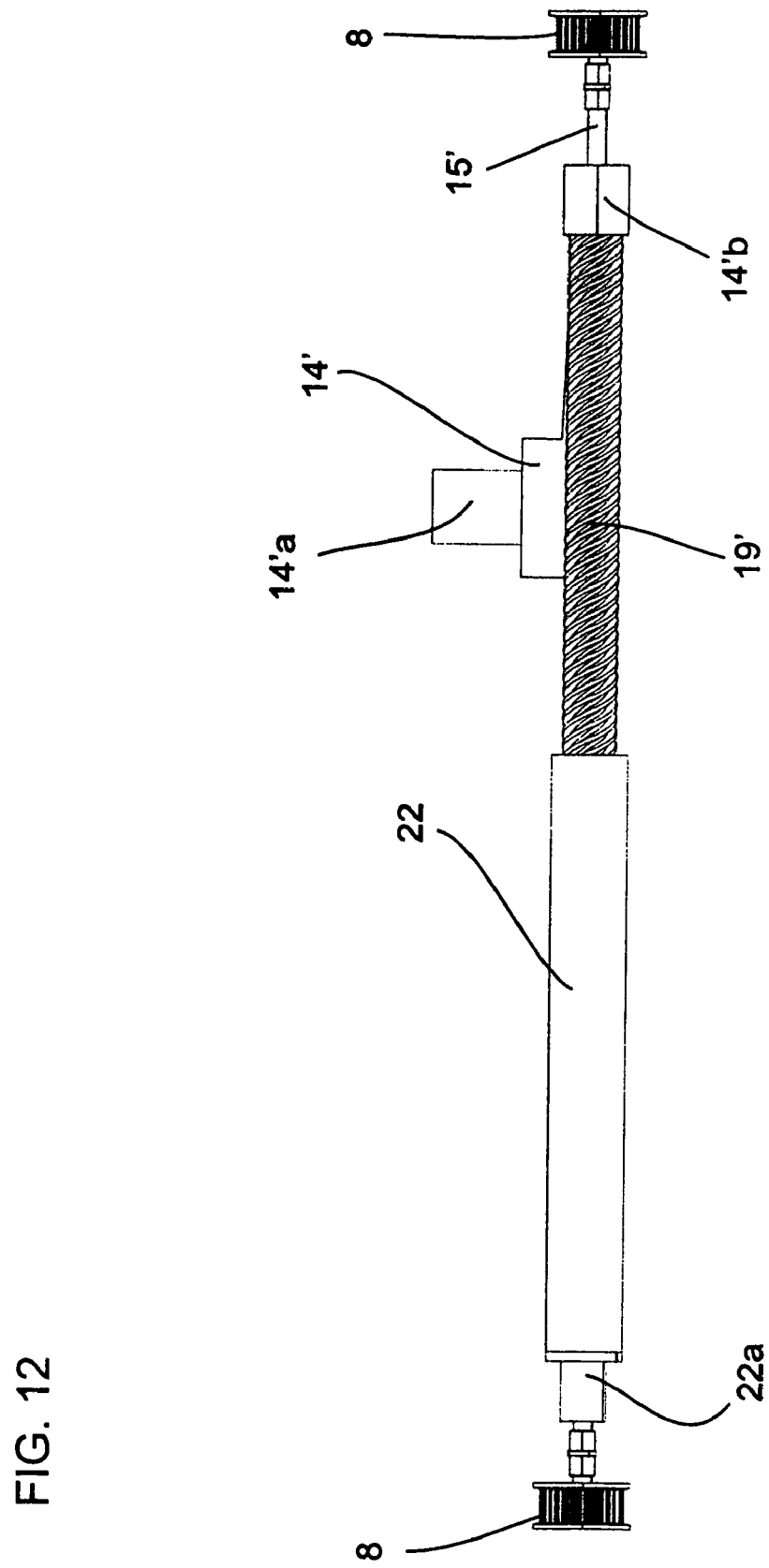
FIG. 12 is a rear view of a drive mechanism.
Figure 13:
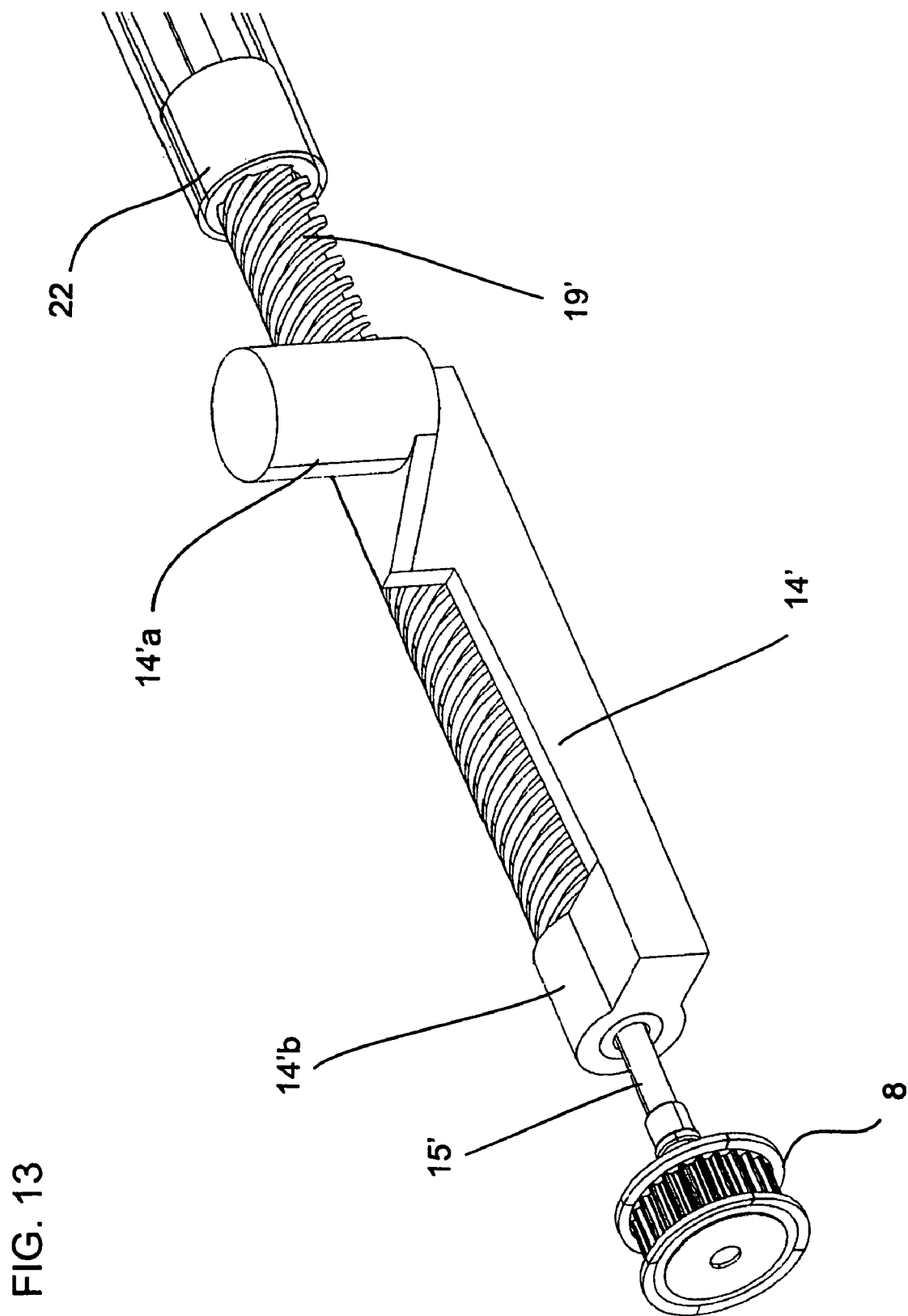
FIG. 13 is a perspective view of a detail of FIG. 11.
Figure 14:
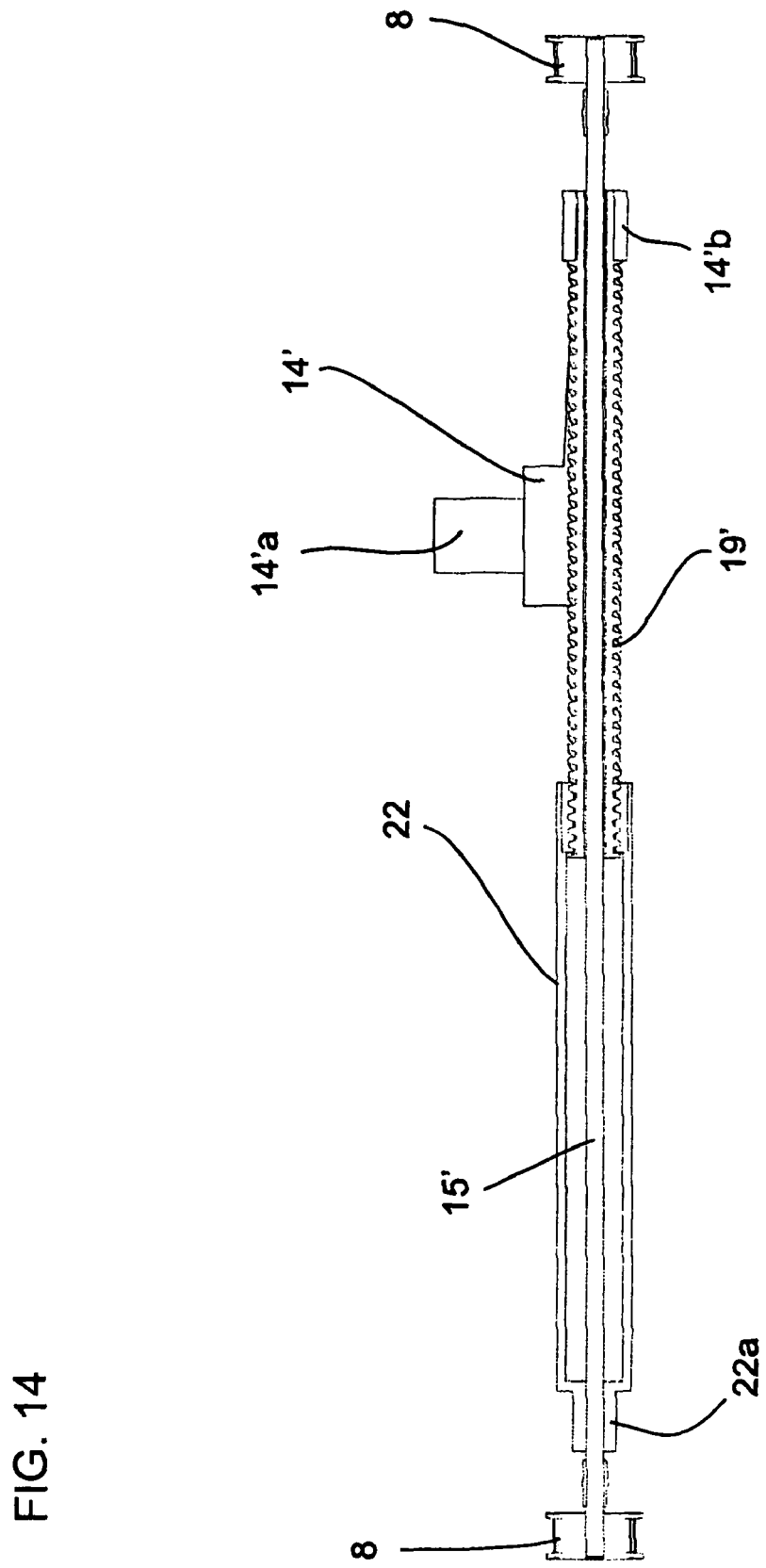
FIG. 14 is a longitudinal section through the drive mechanism of FIG. 12.

FIGS. 8 and 10 depict the frame 2' with the upper transverse part 2'a, to which the shade 4 is fastened, the lower transverse part 2'c, in which the drive mechanism 9' is mounted, and the two longitudinal parts 2'c, which accommodate the raising and lowering mechanisms with the wheels 8, the rollers 10, 11 and the toothed belt 7.

FIGS. 11 to 14 illustrate the drive mechanism 9' including a threaded spindle 19' which is mounted so as to be displaceable in the horizontal direction relative to the transverse part 2'b of the frame 2' and firmly connected with a grip element 14' carrying a grip piece 14'a. To this end, the grip element 14' comprises an approximately cylindrical bearing part 14'b, which is fixed to one of the ends of the threaded spindle 19'. The threaded spindle 19' is designed as a hollow spindle through which a transmission rod 15' passes, whose ends are firmly connected with the drive wheels 8. A transmission sleeve 22, which is provided with an internal thread on one of its end portions, is seated on a portion of the external thread of the threaded spindle 19'. In the starting position illustrated in the Figures of the drawing (cf. FIGS. 12 to 14), in which the shade 4 is lowered, the end portion provided with the internal thread, of the sleeve 22 is seated on the end portion of the threaded spindle 19' facing away from the bearing part 14'b. The sleeve 22 extends coaxially with and on the transmission rod 15' and, by its second end portion, is firmly connected with the rod 15' via a sleeve portion 22a in front of the respective drive wheel 8. Except for the sleeve portion 22a, the transmission rod 15' over its extension is in contact neither with the sleeve 22 nor with the spindle 19'.

By gripping the grip piece 14'a, the threaded spindle 19' can be displaced in the sense of arrow P1 (FIG. 11), thus setting the sleeve 22 and, hence, the transmission rod 15' and, via the latter, the two drive wheels 8 in rotation so as to cause the shade 4 to rise while folding. If the threaded spindle 19' is subsequently moved in the opposite direction, i.e. in the sense of arrow P2 (FIG. 11), the movement of the shade 4 will be inverted, the latter being moved into its closed position. Also in this variant embodiment, any intermediate positions for the shade 4 are feasible.

It will be readily understood by those skilled in the pertinent art that the invention is not limited to the variant embodiments specifically illustrated here. That is, for example, the gear for the transmission of the driving force of the spindle onto the transmission rod can be designed in a different manner. It would also be feasible for the threaded spindle to be driven by the aid of a controllable drive, for instance an electromotor 33.

A further option would be to arrange just one raising and lowering mechanism and, in addition, provide a separate mechanism for keeping the free end of the shade in the horizontal orientation.

We claim:

1. A modular aircraft window, comprising:
an outer pane and an inner pane;
a substantially rectangular frame receiving therein at least one of said outer pane and said inner pane, said frame having longitudinal parts, an upper transverse part and a lower transverse part;
a foldable shade disposed between said outer pane and said inner pane, said shade having a freely movable end;
an operating unit for opening and closing said shade coupled to said freely movable end of said foldable shade, said operating unit including at least one shade-raising and lowering mechanism disposed in one of said longitudinal parts of said frame, a transmission mechanism being a transmission rod operating said at least one shade-raising and lowering mechanism, and a drive mechanism mounted in said lower transverse part of said frame, said drive mechanism including a threaded spindle with an external thread disposed to be movable merely translationally to drive said transmission rod via said external thread, said threaded spindle and said transmission rod being disposed coaxially relative to one another, and said threaded spindle being a hollow spindle with said transmission rod extending therethrough.

2. The aircraft window according to claim 1, wherein a respective raising and lowering mechanism is disposed in each of said longitudinal parts of said frame, and said transmission mechanism is configured to operate both said raising and lowering mechanisms simultaneously.

3. The aircraft window according to claim 1, wherein said raising and lowering mechanism includes a drive wheel firmly connected to said transmission rod.

4. The aircraft window according to claim 1, which comprises a sleeve firmly connected with and coaxially disposed about said transmission rod, said sleeve having a threaded portion meshing with said external thread of said threaded spindle.

5. The aircraft window according to claim 1, which comprises a grip element firmly connected with said threaded spindle.

6. The aircraft window according to claim 5, which comprises a carriage displaceably mounted on said frame, wherein said grip element is mounted to said carriage.

7. The aircraft window according to claim 1, which comprises a controllable drive configured to move said threaded spindle.

8. The aircraft window according to claim 7, wherein said controllable drive is an electromotor.

* * * * *